United States Patent
Rival et al.

(10) Patent No.: US 11,342,742 B2
(45) Date of Patent: May 24, 2022

(54) SET OF ELECTRICAL PROTECTION DEVICES WITH TWO LEVELS THAT ARE CONNECTED IN SERIES

(71) Applicant: Schneider Electric Industries SAS, Rueil Malmaison (FR)

(72) Inventors: Marc Rival, Bernin (FR); Marina Lisnyak, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/110,362

(22) Filed: Dec. 3, 2020

(65) Prior Publication Data
US 2021/0175700 A1    Jun. 10, 2021

(30) Foreign Application Priority Data
Dec. 5, 2019 (FR) ...................................... 1913809

(51) Int. Cl.
*H02H 7/26* (2006.01)
*H02H 1/00* (2006.01)
*H02H 9/02* (2006.01)

(52) U.S. Cl.
CPC .......... *H02H 7/26* (2013.01); *H02H 1/0007* (2013.01); *H02H 1/0023* (2013.01); *H02H 9/02* (2013.01)

(58) Field of Classification Search
CPC ........... H02H 7/26–262; H02H 1/0007; H02H 1/0015; H02H 1/0023
See application file for complete search history.

(56) References Cited

U.S. PATENT DOCUMENTS

| | | | |
|---|---|---|---|
| 6,137,665 A | 10/2000 | Boudaud | |
| 2009/0161272 A1* | 6/2009 | Asokan | G01R 31/1218 361/43 |

(Continued)

FOREIGN PATENT DOCUMENTS

| | | |
|---|---|---|
| EP | 0872939 A1 | 10/1998 |
| FR | 3069951 A1 | 2/2019 |

OTHER PUBLICATIONS

Republique Francaise Institut National De La Propriete Industrielle, French Search Report and Opinion for French Patent Application No. FR1913809 dated Aug. 10, 2020, 10 pages.

*Primary Examiner* — Jared Fureman
*Assistant Examiner* — Christopher J Clark
(74) *Attorney, Agent, or Firm* — Locke Lord LLP

(57) ABSTRACT

A set of electrical protection devices with two levels that are connected in series, the first level including a circuit breaker that is referred to as the first or upstream circuit breaker and the second level including one or more circuit breakers referred to as second or downstream circuit breakers, which are connected in parallel with respect to one another.
The trip for the upstream circuit breaker, instead of including what are referred to as instantaneous protection means, includes, firstly, a first trip chain making it possible to adjust the long-delay trip curve for inverse time and the short-delay trip curve with a no-trip time and, secondly, a second trip chain including an optical sensor that is capable of discerning light between 300 and 450 nm by eliminating visible and infrared light so as to eliminate the light that is characteristic of gas jets emitted by the one or more circuit breakers referred to as downstream circuit breakers during a switching operation, and means for simultaneously measuring the current level and the maximum threshold of light emitted at the busbars, this second trip chain being capable of causing the upstream circuit breaker to trip when the current exceeds (Continued)

a predetermined value and the light emitted exceeds a predetermined threshold for emitted light.

10 Claims, 6 Drawing Sheets

(56) References Cited

U.S. PATENT DOCUMENTS

| | | |
|---|---|---|
| 2014/0055886 A1 | 2/2014 | Spangenberg et al. |
| 2014/0111896 A1* | 4/2014 | Liptak .................. H02H 1/0084 361/64 |
| 2019/0044317 A1 | 2/2019 | Rival |

* cited by examiner

SET OF ELECTRICAL PROTECTION DEVICES WITH TWO LEVELS THAT ARE CONNECTED IN SERIES

TECHNICAL FIELD

The present invention relates to a set of electrical protection devices with two levels that are connected in series, the first level including a circuit breaker that is referred to as the first or upstream circuit breaker and the second level including one or more circuit breakers referred to as second or downstream circuit breakers, which are connected in parallel with respect to one another, the one or more downstream circuit breakers having a lower rating than the first circuit breaker, each circuit breaker including, for each of the phases, a switching block through which passes a current line on which two separable contacts and a sensor for measuring the current are placed, means for actuating the contacts manually or by remote control, means for automatically opening the contacts controlled by a trip, said trip being controlled by the aforementioned current sensor, and including means for adjusting the long-delay trip curve for inverse time and the short-delay trip curve with a no-trip time, the trip of the one or more what are referred to as second circuit breakers further including what are referred to as instantaneous protection means allowing the trip associated with these one or more what are referred to as second circuit breakers to be actuated when the current reaches what is referred to as an instantaneous trip DIN threshold of these one or more second circuit breakers.

PRIOR ART

Such sets of electrical protection devices which make it possible to simultaneously perform three functions, namely extreme switching performance by cascading between two low-voltage switching-device stages, total selectivity between these two stages, and ultra-fast protection of the upper stage in the event of an intermediate fault between the two stages, are known.

However, these three functions are difficult to make compatible with a level of performance corresponding to that which has to be reached in systems of low-voltage switching devices which are intended mainly for auxiliary switchboards of ships with very high power at low voltage, typically powers of higher than 100 KA and 690 V. As a general rule, cascading and selectivity techniques are often incompatible for high current values with voltages of higher than 525 V.

The present invention solves these problems and proposes a set of low-voltage electrical protection devices that is intended for use in very-high-power low-voltage applications so as to simultaneously provide extreme switching performance by cascading, total selectivity, and ultra-fast protection of the upper stage in the event of an intermediate fault between the two stages.

DISCLOSURE OF THE INVENTION

To this end, one subject of the present invention is a set of electrical protection devices with two levels that are connected in series of the type mentioned above, this set being characterized in that the trip for the upstream circuit breaker, instead of including what are referred to as instantaneous protection means, includes, firstly, a first trip chain making it possible to adjust the long-delay trip curve for inverse time and the short-delay trip curve with a no-trip time and, secondly, a second trip chain including an optical sensor that is capable of discerning light between 300 and 450 nm by eliminating visible and infrared light so as to eliminate the light that is characteristic of gas jets emitted by the one or more circuit breakers referred to as downstream circuit breakers during a switching operation, and means for simultaneously measuring the current level and the maximum threshold of light emitted at the busbars, this second trip chain being capable of causing the upstream circuit breaker to trip when the current exceeds a predetermined value and the light emitted exceeds a predetermined threshold for emitted light.

According to one particular feature, the or each trip includes means for adjusting the long-delay trip curve for inverse time for currents smaller than substantially 10 times the nominal current in and means for adjusting the short-delay trip curve with a no-trip time of 20 ms for currents with a value of between 1.5 and 10 times the nominal current.

According to another feature, the circuit breakers are limiting circuit breakers.

According to another feature, the aforementioned predetermined current value and threshold are 10 times the nominal current in and 8000 lux, respectively.

According to another feature, the limiting circuit breaker referred to as the first circuit breaker has a rating of between 800 and 1000 A, while the one or more limiting circuit breakers referred to as second circuit breakers have a rating of between 40 A and 250 A.

According to another feature, the circuit breaker referred to as the first circuit breaker has a rating of 800 A, while the circuit breaker referred to as the second circuit breaker has a rating of 100 A.

According to another feature, the value of the instantaneous trip threshold S of the one or more second circuit breakers is around 11 kArms.

According to another feature, the aforementioned upstream circuit breaker includes a pyrotechnic propellant that is intended to allow an ultra-fast trip in the presence of a sparkover fault between phases in the region located between the two stages.

According to another feature, the aforementioned optical sensor includes a discriminating optical fibre, said optical fibre including a fibre made of fluoride glass including, at its ends, a treatment that is intended to block waves that are longer than 450 nm.

Another subject of the present invention is a set of electrical devices with two levels, characterized in that it is used in auxiliary switchboards of ships with a power of higher than 100 KA/690 V.

However, other advantages and features of the invention will become more clearly apparent in the detailed description that follows with reference to the appended drawings, which are given solely by way of example and in which:

DESCRIPTION OF ONE PARTICULAR EMBODIMENT OF THE INVENTION

Figure 1:
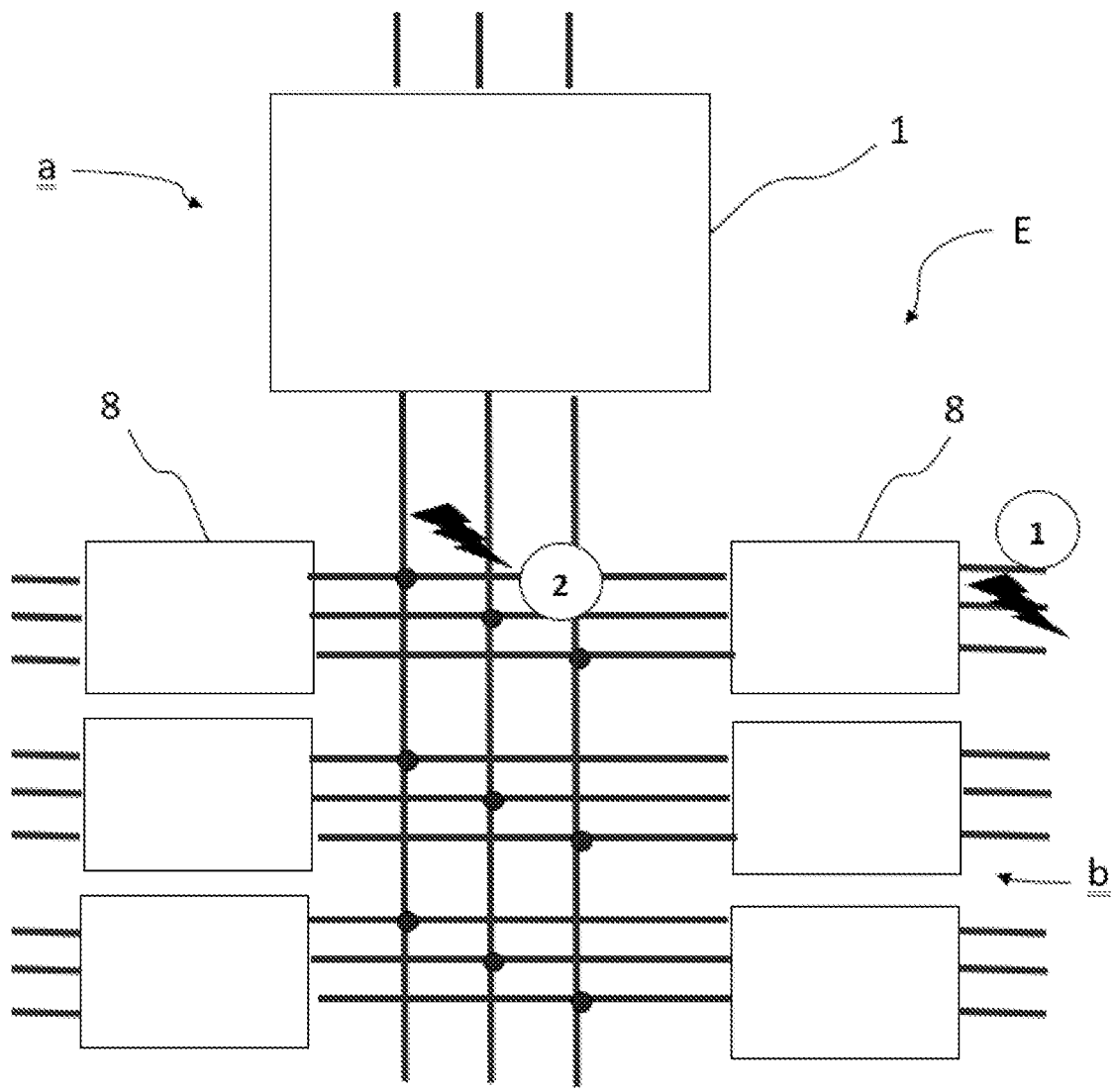
FIG. 1 shows an electrical schematic illustrating a set of low-voltage electrical devices with two levels according to the prior art.
Figure 2:
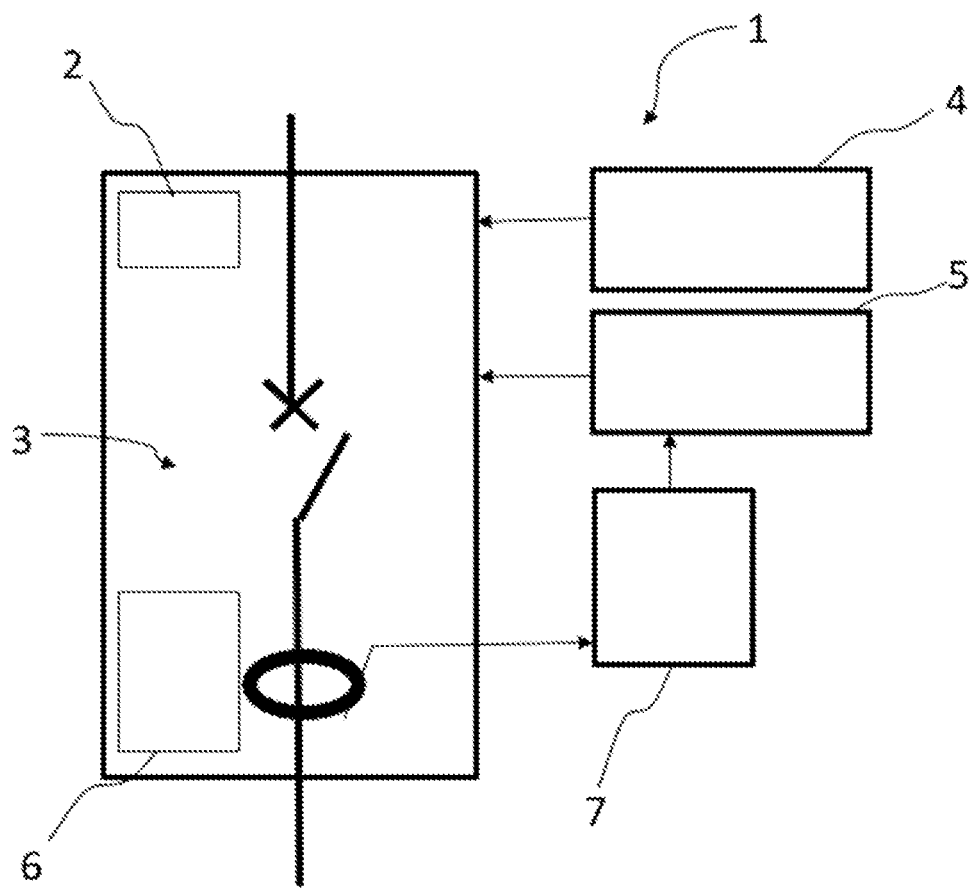
FIG. 2 is a block diagram illustrating an electronic circuit breaker belonging to a set of devices according to the prior art.

In FIG. 1, it is possible to see a set E of low-voltage electrical devices, or system of devices, including two levels a, b connected in series, according to the prior art. This set E includes a limiting circuit breaker 1, referred to as the upstream or first circuit breaker, having a rating that is advantageously 800 A and including, as illustrated in FIG. 2, a switching block 2 including a mechanism 3 for switching the contacts of the circuit breaker, a mechanism 4 for actuating the contacts of the circuit breaker manually or by remote control, a trip mechanism 5 of electromagnetic-coil type, a current sensor 6 per phase, an electronic trip 7 that makes it possible to adjust the long-delay trip curve for inverse time for currents smaller than, advantageously, 10 times the nominal current in and to adjust the short-delay trip curve with a no-trip time of, advantageously, 20 ms for currents of between, advantageously, 1.5 and 10 times the nominal current, and instantaneous protection means integrated into the circuit breaker and having a fixed threshold of, advantageously, 22 kA (11 kA rms).

This set of devices E also includes one or more limiting circuit breakers referred to as downstream or second circuit breakers 8, which are connected in parallel to one another, these one or more limiting circuit breakers 8 being connected in series with the aforementioned upstream limiting circuit breaker 1.

These one or more what are referred to as downstream limiting circuit breakers 8 have a rating that is advantageously between 40 A and 250 A, and include, in the same way as for the one or more upstream circuit breakers, a limiting-type switching portion, a manual or remote-controlled actuating mechanism, a trip mechanism including an electromagnetic coil, a current sensor per phase, an electronic trip, and integrated instantaneous protection means, which are not adjustable, having a fixed threshold of, advantageously, 3000 A.

The operation of such a circuit breaker according to the prior art will be described below with reference to FIGS. 1 to 3.

Figure 3:
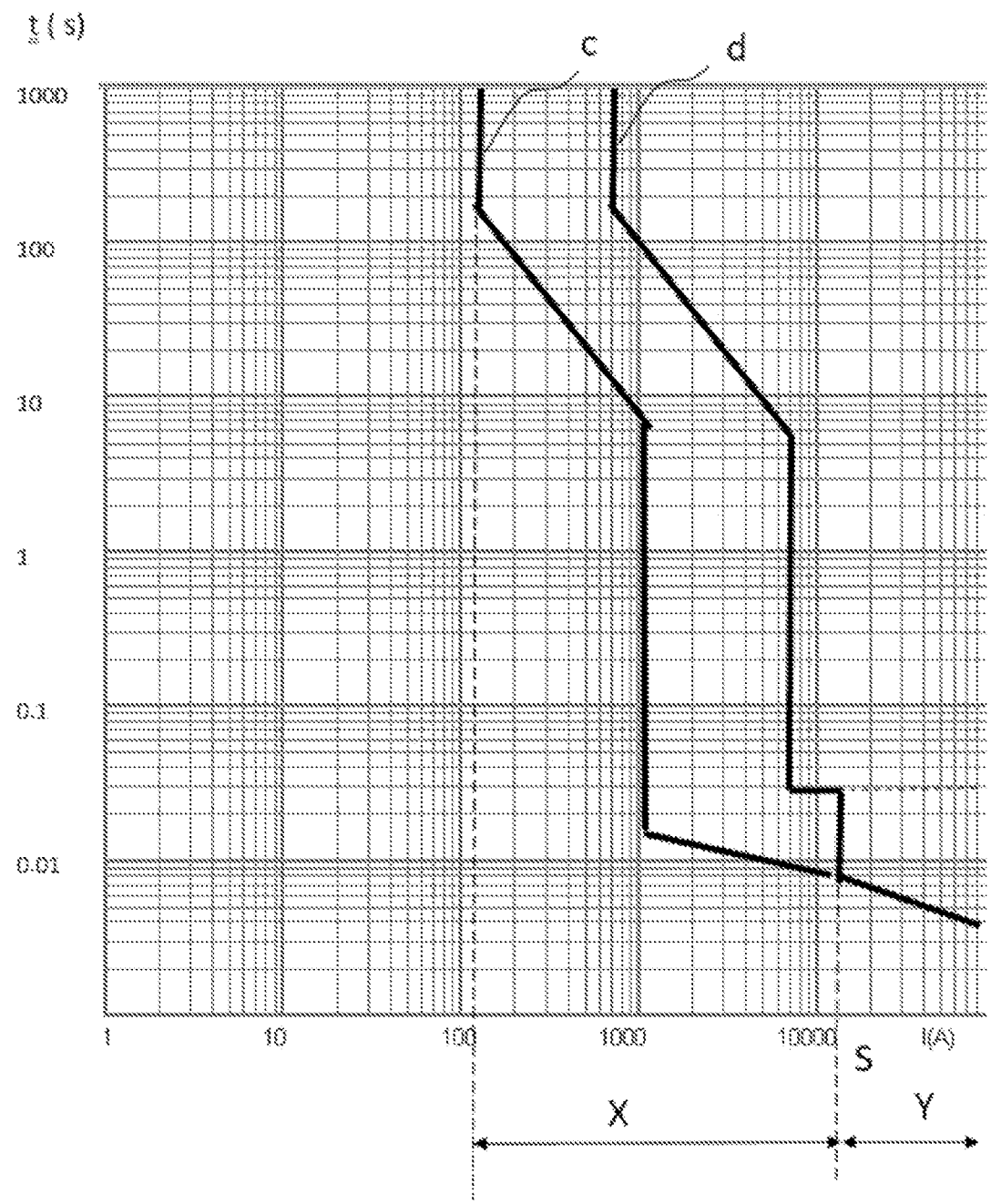
FIG. 3 shows a graph illustrating two trip curves corresponding, respectively, to those of two, respectively upstream and downstream, circuit breakers belonging to the set of devices according to the aforementioned prior art.

In FIG. 3, the graph illustrates the two trip curves c, d, respectively, of the two, upstream and downstream, circuit breakers with the trip time T in seconds on the y-axis and the current I, flowing though the circuit on which the sets of circuit breakers are placed, in amperes on the x-axis.

First, the case of the occurrence of a fault at position 1 in FIG. 1, i.e. downstream of what is referred to as the second circuit breaker 8, will be considered.

In the region X, illustrated in FIG. 3, the current through the device is lower than the DIN threshold of the first circuit breaker 1. Only the second circuit breaker 8 is tripped, by virtue of the time selectivity due to the 20 ms delay associated with the first circuit breaker 1, which results in the second circuit breaker 8 being tripped first.

In the region Y, the value of the current is higher than the DIN threshold, i.e. than the instantaneous trip threshold S of the first circuit breaker 1; both circuit breakers 1, 8 are tripped; there is cascading when the switched performance is higher than the maximum switching performance of the second circuit breaker 8. There is no selectivity because the upstream circuit breaker 1 has been tripped.

It will be recalled that selectivity is the coordination of automatic switching devices so that a fault that occurs at any point on the network is cleared by the circuit breaker placed immediately upstream of the fault, and only by that one. Cascading is a technique that consists in increasing the switching capability of a circuit breaker by coordinating it with another protection device placed upstream.

The case of the occurrence of a high short-circuit fault at position 2, i.e. downstream of the first circuit breaker 1 and upstream of the second circuit breaker 8, will now be considered.

In this case, what is referred to as the first limiting circuit breaker 1 limits the current by breaking the contacts, and its trip is activated as soon as the value of the current exceeds the DIN threshold of the instantaneous trip. The trip coil is activated, controls the opening of the mechanism, and confirms the opening of the main contacts.

Figure 4:
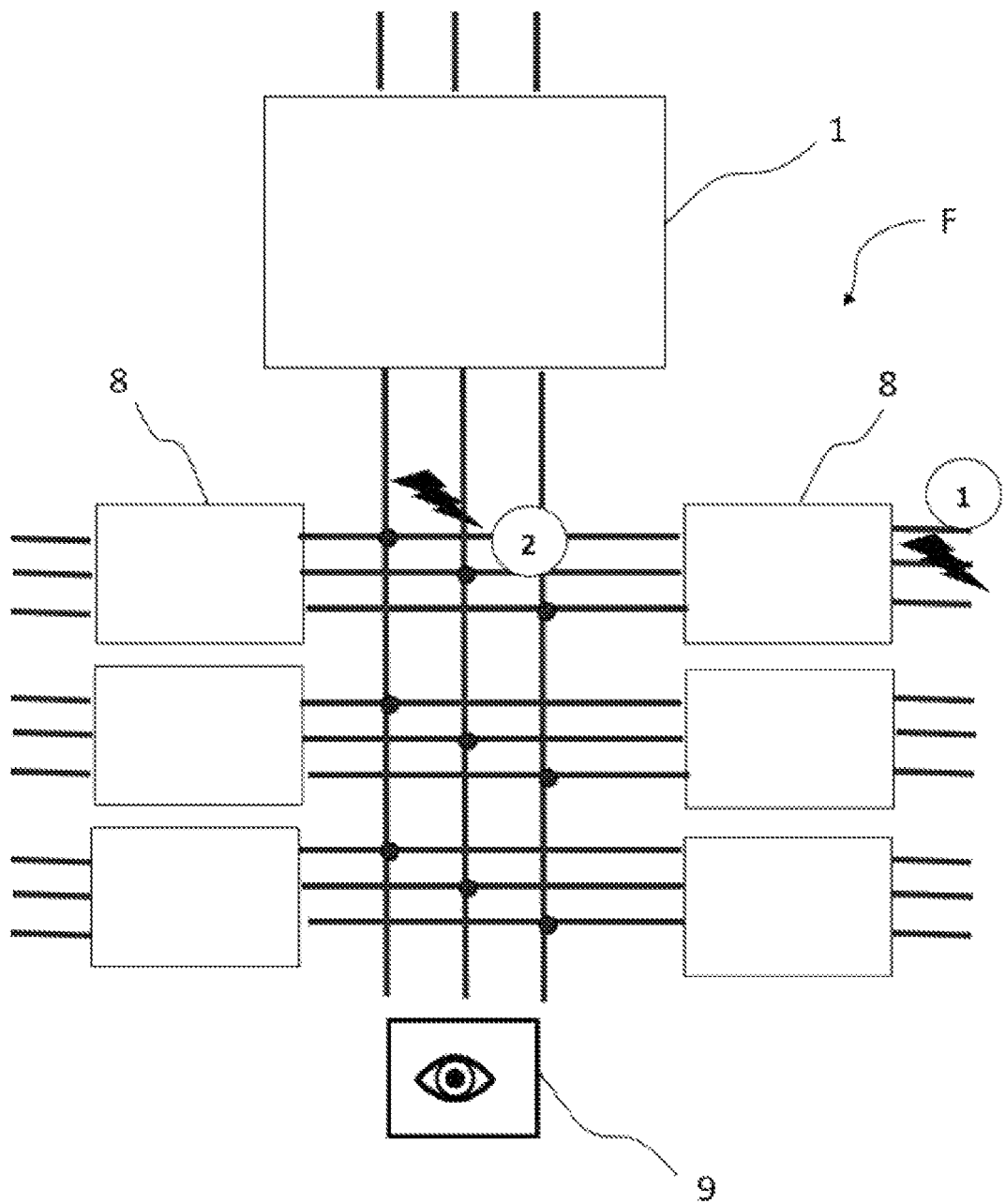
FIG. 4 shows an electrical schematic illustrating a set of low-voltage electrical devices according to one particular embodiment of the invention.

FIG. 4 shows a set F of devices according to one particular embodiment of the invention.

This set of devices according to the invention includes, like in the prior art, a first limiting circuit breaker 1, referred to as the upstream circuit breaker, and one or more what are referred to as second or downstream circuit breakers 8, connected in parallel with one another, these one or more what are referred to as second circuit breakers 8 being placed in series with respect to the first circuit breaker 1.

The one or more second circuit breakers 8 are constructed in the same way as in the prior art.

Figure 5:
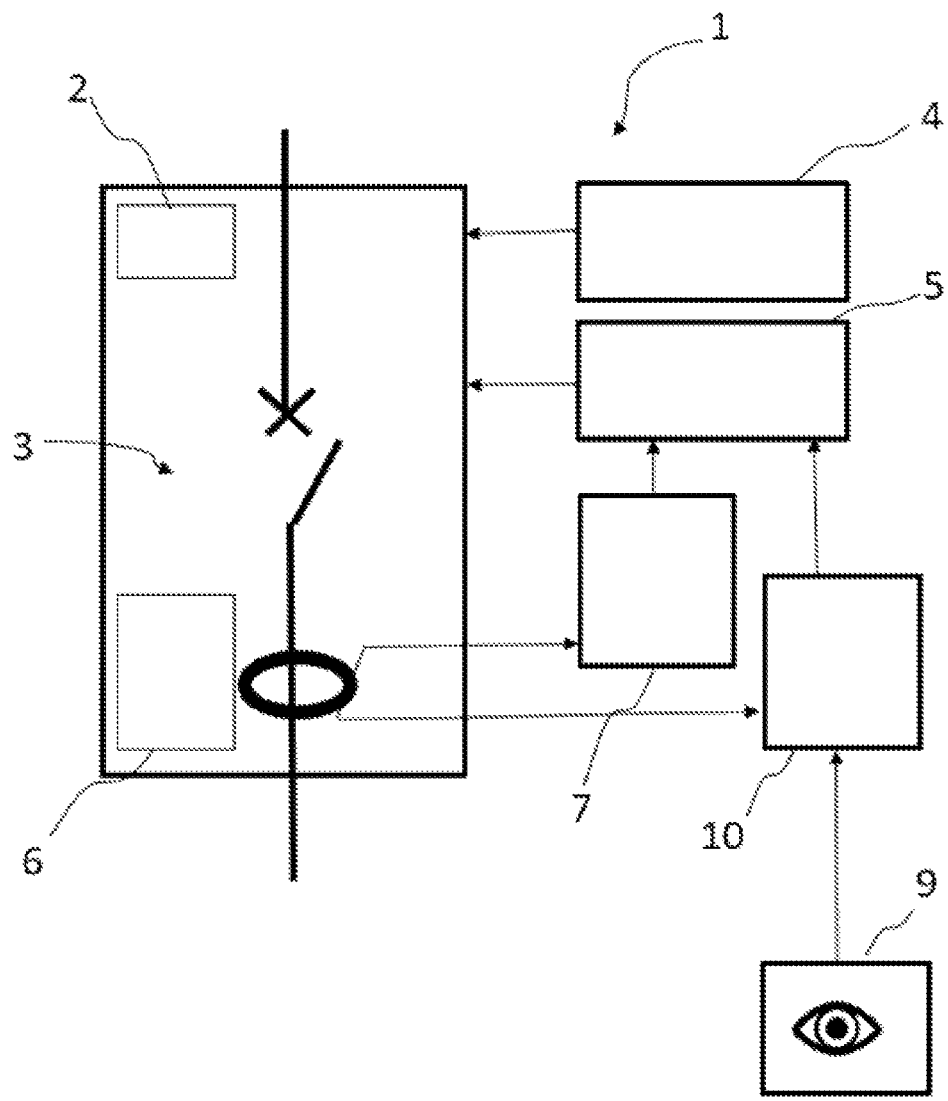
FIG. 5 is a block diagram illustrating an electronic circuit breaker belonging to a set of devices according to one particular embodiment of the invention.

As illustrated more particularly in FIG. 5, the upstream circuit breaker 1 according to the invention includes, besides the elements which are already present in an upstream circuit breaker according to the prior art, a discriminating optical sensor 9 capable of controlling an additional control unit 10, this unit 10 being capable, on the one hand, of receiving information from the current measurement sensor 6 belonging to the switching block 2 and, on the other hand, of controlling the trip-mechanism opening coil 5 for the contacts of what is referred to as the first circuit breaker 1.

Thus, by virtue of the technical means set out above, the trip of this first circuit breaker 1 is distinguished from that of the prior art in that it is broken down into a first and a second trip chain. The first trip chain includes means for adjusting the long-delay trip curve for inverse time for currents smaller than 10 times the nominal current in, and for adjusting the short-delay trip curve with a no-trip time of, advantageously, 20 ms adjustable for, advantageously, 1.5 and 10 times the nominal current. This first trip chain does not include integrated instantaneous protection means having a fixed threshold.

The second trip chain includes means for simultaneously measuring the current level and the maximum threshold of light emitted by the optical sensor 6, said sensor discerning light between 300 and 450 nm by eliminating visible and infrared light so as not to take into account the light that is emitted by the arc on the busbars and to eliminate the light that is characteristic of gas jets emitted by the low-voltage circuit breakers when switching.

The operation of such a set of devices will be described below with reference to FIGS. 4 to 6.

First, the case of the occurrence of a fault at position 1, as illustrated in FIG. 4, i.e. downstream of what is referred to as the second circuit breaker 8, will be considered.

Figure 6:
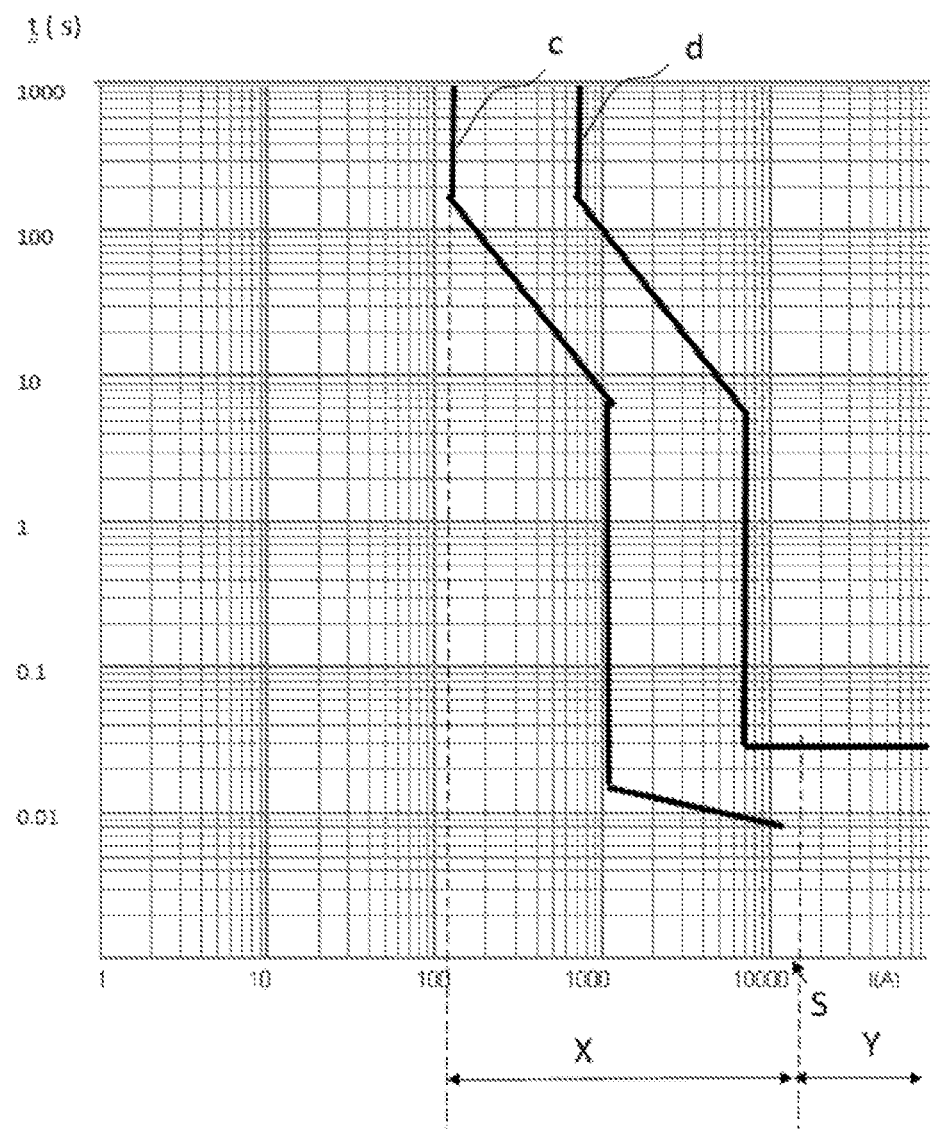
FIG. 6 shows a graph illustrating two trip curves corresponding, respectively, to those of two, respectively upstream and downstream, circuit breakers belonging to the set of devices according to the aforementioned embodiment of the invention.

In a region X, such as defined in FIG. 6, corresponding to a current value lower than the DIN threshold S of the first limiting circuit breaker 1, only the second circuit breaker 8 is tripped; there is, just like in the prior art, time selectivity.

In the region Y, the value of the current is higher than the DIN threshold S of the first limiting circuit breaker 1. In this case, only the second circuit breaker 8 is tripped. In the same way as in the prior art, there is cascading when the switched performance is higher than the maximum switching performance of the second circuit breaker 8 by virtue of the assistance with respect to the breaking of the contacts of the switching block 2 of the first circuit breaker 1.

In this case, there is selectivity between the two circuit breakers, since the first circuit breaker 1 has not been tripped on the one hand because this first circuit breaker 1 does not include what are referred to as instantaneous trip means and on the other hand because the light sensor 9 has eliminated the light generated by the escape of breaking gases from the downstream circuit breaker 8. Specifically, due to this elimination, the second trip chain of the upstream circuit breaker 1 has not caused the upstream circuit breaker 1 to trip because the light measurement taken by the additional control unit 10 has not exceeded the threshold value.

Specifically, when there is a fault downstream of the second circuit breaker 8, this circuit breaker, in interrupting the current, emits, via the ionized gas jets escaping through the outlets, light in the in the visible and infrared, corresponding to a wavelength of longer than 450 nm. If the light sensor were active for these wavelength values, selectivity would not be guaranteed. The first circuit breaker 1 would be opened by the activation of the optical sensor 9 and the current measurement.

The case of the occurrence of a high short-circuit fault at position 2 in FIG. 4, i.e. downstream of the first circuit breaker 1 and upstream of the second circuit breaker 8, will now be examined. In this case, the first limiting circuit breaker 1 limits the current by breaking and the first trip chain of its trip 7 is activated when the light is greater than 8000 lux and the current value is higher than a predetermined value, for example 10 In, i.e. 10 times the nominal current in. The coil of the main actuator is activated, controls the opening of the mechanism, and confirms the opening of the main contacts. There is self-protection of the circuit breaker in the event of a fault.

It should be noted that since the second circuit breaker 8 is a limiting-type device, its electrodynamic withstand is low (approximately 15 times the nominal current). This is essential for it to be able to assist in switching as soon as possible during switching attempts at performance levels higher than the short-circuit currents that can be withstood by the downstream circuit breaker alone, which is also a limiting-type circuit breaker.

Thus, it is possible to distribute the switching energy between the two circuit breakers in series 1, 8.

The value of the instantaneous trip threshold S is fixed at a value that is slightly lower than the electrodynamic withstand so as to ensure self-protection of the circuit breaker. When the current is higher than the electrodynamic withstand, it must trip instantaneously, for example within 10 ms.

It should be noted that according to another embodiment, the downstream limiting circuit breaker 8 may be a circuit breaker based on magnetothermic technology without an electronic portion.

It should also be noted that this optical sensor 9 will advantageously be coupled to a pyrotechnic propellant, acting only in the event of an interphase sparkover fault in the region located between the two levels.

Thus, according to the invention, the upstream limiting circuit breaker 1 is equipped with a dual trip chain. A first trip chain provides protection from overload currents up to 10 times the nominal current, approximately 12 kÅ for an IN of 800 A, with a delay of 20 ms for this "instantaneous" value, 20 ms being longer than the switching time of the downstream circuit breaker 8 at this performance level of 12 kA RMS. A second trip chain activated by a current measurement of higher than 10 In and a light measurement by an optical sensor that blocks wavelengths longer than 450 nm, since these wavelengths are characteristic of the gas jets emitted by low-voltage circuit breakers when switching.

By virtue of this dual trip chain, what is obtained for a fault occurring at position 1 is, on the one hand, extreme switching performance by cascading between the two low-voltage switching-device stages, by the two switching sets cooperating, and, on the other hand, total selectivity between these two stages, characterized by no tripping of the upstream circuit breaker.

For a fault occurring at position 2, what is obtained is ultra-fast protection of the upper stage and of the associated busbars, by virtue of the second trip chain.

This is achieved with substantially moderated external manifestations, through better absorption and better distribution of the switching energy between the two stages.

To obtain ultra-fast protection during an internal fault occurring between the two stages of the installation, the upstream circuit breaker 1 may advantageously be equipped with a pyrotechnic propellant, acting only in the event of a sparkover fault between phases in the region located between the two stages.

It should be noted that in the case of what is referred to as a "herringbone" switchboard, as illustrated in FIG. 4, just one discriminating optical sensor is required. It will be positioned opposite the upstream circuit breaker, at the height of the vertical busbars that connect to the upstream device and to which the downstream devices of lower rating will connect. Specifically, if an arc arises on the vertical busbars, the electrodynamic forces will push the arc away from the transformer.

It should be noted that the discriminating optical sensor could be replaced with a discriminating optical fibre, i.e. a fibre made of fluoride glass with a treatment at the ends that blocks waves of longer than 450 nm.

The invention is advantageously applied to low-voltage switching-device systems intended mainly for auxiliary switchboards of ships with very high power at low voltage, typically for powers of higher than 100 KA and 690 V. Specifically, for critical installations such as ships, it is crucial to ensure selectivity between the different stages. An incident on one load should not render the other loads inoperative. However, it may advantageously be applied to all fields which require this level of simultaneous cascading and selectivity performance, for example in the field of renewable energies, with increasingly high performance levels.

This system comprising two stages connected in series makes it possible to simultaneously provide three functions that are difficult to make compatible at this level of performance, namely extreme switching performance by cascading between the two device stages, total selectivity between the two stages, and ultra-fast protection of the upper stage in the event of an intermediate fault between the two stages.

Of course, the invention is not limited to the embodiment described and illustrated, which has been given only by way of example.

On the contrary, the invention comprises all technical equivalents of the means described and combinations thereof provided that these are implemented according to the spirit of the invention.

The invention claimed is:

1. A set of electrical protection devices with two levels that are connected in series, the first level including a circuit breaker that is a first or upstream circuit breaker and the second level including one or more circuit breakers that are a second or downstream circuit breakers, which are connected in parallel with respect to one another, the one or more downstream circuit breakers having a lower rating than the first circuit breaker, each circuit breaker including, for each of the phases, a switching block through which passes a current line on which two separable contacts and a sensor for measuring the current are placed, means for actuating the contacts manually or by remote control, means for automatically opening the contacts controlled by a trip mechanism, said trip mechanism being controlled by the current sensor, and including means for adjusting long-delay trip curve for inverse time and a short-delay trip curve with a no-trip time, the trip mechanism of the one or more second circuit breakers further including instantaneous protection means allowing the trip associated with the one or more second circuit breakers to be actuated when the current reaches an instantaneous trip DIN threshold of the one or more second circuit breakers, wherein the trip mechanism for the upstream circuit breaker, instead of including instantaneous protection means, includes, firstly, a first trip chain making it possible to adjust the long-delay trip curve for inverse time and the short-delay trip curve with a no-trip time and, secondly, a second trip chain including an optical sensor that is capable of discerning light between 300 and 450 nm by eliminating visible and infrared light so as to eliminate the light that is characteristic of gas jets emitted by the one or more downstream circuit breakers during a switching operation, and means for simultaneously measuring the current level and the of light emitted at the busbars, the second trip chain being capable of causing the upstream circuit breaker to trip when the current exceeds a predetermined value and the light emitted exceeds a predetermined threshold for emitted light.

2. The set of electrical protection devices according to claim 1, wherein the first trip chain includes means for adjusting the long-delay trip curve for inverse time for currents smaller than substantially 10 times the nominal current and means for adjusting the short-delay trip curve with a no-trip time of 20 ms for currents with a value of between 1.5 and 10 times the nominal current.

3. The set of electrical protection devices according to claim 1, wherein the first and second circuit breakers are limiting circuit breakers.

4. The set of electrical protection devices according to claim 3, wherein the predetermined current value and threshold are 10 times the nominal current and 8000 lux, respectively.

5. The set of electrical protection devices according to claim 3, wherein the limiting first circuit breaker has a rating of between 800 and 1000 A, while the limiting second circuit breakers have a rating of between 40 A and 250 A.

6. The set of electrical protection devices according to claim 1, wherein the first circuit breaker has a rating of 800 A, while the second circuit breaker has a rating of 100 A.

7. The set of electrical protection devices according to claim 1, wherein the value of the instantaneous trip threshold of the one or more second circuit breakers is around 11 kArms.

8. The set of electrical protection devices according to claim 1, wherein the upstream circuit breaker includes a pyrotechnic propellant that is intended to allow an ultra-fast trip in the presence of a sparkover fault between phases in the region located between the two levels.

9. The set of electrical protection devices according to claim 1, wherein the optical sensor includes a discriminating optical fibre, said optical fibre including a fibre made of fluoride glass including, at its ends, a treatment that is intended to block waves that are longer than 450 nm.

10. The set of electrical protection devices according to claim 1, wherein the set of electrical protection devices is configured for use in auxiliary switchboards of ships with a power of higher than 100 KA/690 V.

* * * * *